(12) United States Patent
Zerba (10) Patent No.: US 9,126,464 B2
(45) Date of Patent: Sep. 8, 2015

(54) FIFTH WHEEL ASSEMBLY WITH AUTOMATIC LOCKOUTS

(71) Applicant: SAF-HOLLAND, Inc., Holland, MI (US)

(72) Inventor: Michael Zerba, Holland, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 41 days.

(21) Appl. No.: 13/830,589

(22) Filed: Mar. 14, 2013

(65) Prior Publication Data

US 2013/0328286 A1  Dec. 12, 2013

Related U.S. Application Data

(60) Provisional application No. 61/658,624, filed on Jun. 12, 2012.

(51) Int. Cl.
*B60D 1/01*  (2006.01)
(52) U.S. Cl.
CPC ..................................... *B60D 1/015* (2013.01)
(58) Field of Classification Search
CPC .... B60D 1/015; B62D 53/08; B62D 53/0835; B62D 53/0878

USPC ............................................ 280/438.1, 441.1
See application file for complete search history.

(56) References Cited

U.S. PATENT DOCUMENTS

| 2,441,293 | A | * | 5/1948 | Seyferth | 280/441.1 |
| 2,602,674 | A | * | 7/1952 | Harris | 280/438.1 |
| 7,938,429 | B2 | * | 5/2011 | Mann et al. | 280/438.1 |
| 2007/0007747 | A1 | * | 1/2007 | Laarman | 280/438.1 |
| 2011/0025020 | A1 | * | 2/2011 | Alguera et al. | 280/504 |

* cited by examiner

*Primary Examiner* — Joseph Rocca
*Assistant Examiner* — Felicia L Brittman
(74) *Attorney, Agent, or Firm* — Price Heneveld LLP (57) ABSTRACT

A fifth wheel hitch assembly includes a support bracket operably coupled to a vehicle frame member; a hitch plate that has a throat adapted to receive a kingpin and a rear portion, wherein the hitch plate is pivotably coupled to the support bracket for pivoting between a first and second positions; a stabilizer assembly coupled to the hitch plate, the stabilizer assembly operating between an unlocked position, wherein the hitch plate pivots between the first and second positions, and the locked position, wherein the stabilizer assembly is coupled with the rear portion and a select one of the vehicle frame and the support bracket, thereby restricting pivotable movement of the hitch plate; and a remotely located controller that operates the stabilizer assembly between the unlocked and locked positions.

10 Claims, 7 Drawing Sheets

FIFTH WHEEL ASSEMBLY WITH AUTOMATIC LOCKOUTS

FIELD OF THE INVENTION

The present invention generally relates to fifth wheel hitch plate assemblies, and more specifically, the invention relates to pivotable hitch plate assemblies, wherein the hitch plate pivots in relation to the vehicle frame.

BACKGROUND OF THE INVENTION

Fifth wheel hitch assemblies have been adapted to include hitch plates that are pivotable about a central portion thereof to provide various advantages over non-pivoting hitch plates, including allowing the hitch plates to pivot with respect to a vehicle's frame when the vehicle is aligning and attaching with a trailer or allowing the hitch plates to pivot with respect to the vehicle's frame when the vehicle and trailer are attached and traveling over uneven surfaces. Dump trailers require a fifth wheel assembly with a non-pivoting hitch plate to operate the telescoping dump function of such trailers.

BRIEF SUMMARY OF THE INVENTION

According to one aspect of the present invention, a fifth wheel hitch assembly includes a support bracket adapted to operably coupled with a tractor frame. The hitch assembly also includes a hitch plate pivotably coupled to the support bracket for pivoting movement between a first position and a second position. The hitch plate has a throat adapted to receive a kingpin of a trailer and a rearwardly extending rear portion with a first section and a second section juxtapositioned across the throat from one another. The hitch assembly also includes a stabilizer assembly operable between an unlocked position, wherein the stabilizer assembly is coupled with a select one of the support bracket or the rear portion of the hitch plate such that the hitch plate may pivot between the first and second positions, and the locked position, wherein the stabilizer assembly is coupled with the support bracket and the rear portion of the hitch plate, thereby limiting movement the hitch plate between the first and second positions and supporting the first and second sections of the rear portion of the hitch plate. The assembly further includes a controller that operates the stabilizer assembly between the unlocked and locked positions from a location remote from the stabilizer assembly.

According to another aspect of the present invention, a fifth wheel hitch assembly includes a support bracket operably coupled to a vehicle frame member. The hitch assembly also includes a hitch plate that has a throat adapted to receive a kingpin of a trailer and a rear portion. The hitch plate is pivotably coupled to the support bracket for pivoting between a first position and a second position. In addition, the hitch assembly includes a stabilizer assembly coupled below the hitch plate along the rear portion. The stabilizer assembly operates between an unlocked position and a locked position. In the unlocked position the hitch plate may pivot between the first and second positions. In the locked position the stabilizer assembly is coupled with the rear portion and a select one of the vehicle frame or the support bracket, thereby restricting pivotable movement of the hitch plate between the first and second positions. The assembly further includes a controller that operates the stabilizer assembly between the unlocked and locked positions from a location that is located remotely from the stabilizer assembly.

According to yet another aspect to the present invention, a method for stabilizing a hitch plate of a fifth wheel hitch assembly includes providing a vehicle frame member and a support bracket operably coupled with the frame member. The method also includes providing a hitch plate pivotably coupled to the support bracket for pivotable movement between a first position and a second position. The hitch plate has a rearwardly extending first section and a rearwardly extending second section. The method further includes providing a stabilizer assembly operable between an unlocked position, wherein the hitch plate may pivot between the first and second positions and a locked position, wherein the first and second sections are detachably coupled with the support bracket, thereby restricting movement of the hitch plate between the first and second positions. The method still further includes operating the stabilizer assembly between the unlocked and locked positions via a controller that is positioned at a location remote from the stabilizer assembly, and pivoting the hitch plate about the support bracket to position the first and second section in alignment with the support bracket to allow for the stabilizer assembly to transition from the unlocked position to the locked position. The method further includes coupling the first and second sections of the hitch plate with the support bracket to restrict the pivotable movement the hitch plate between the first and second positions and stabilize the first and second sections of the hitch plate, thereby engaging the stabilizer assembly in the locked position.

These and other features, advantages, and objects of the present invention will be further understood and appreciated by those skilled in the art by reference to the following specification, claims, and appended drawings.

DETAILED DESCRIPTION

Figure 1:
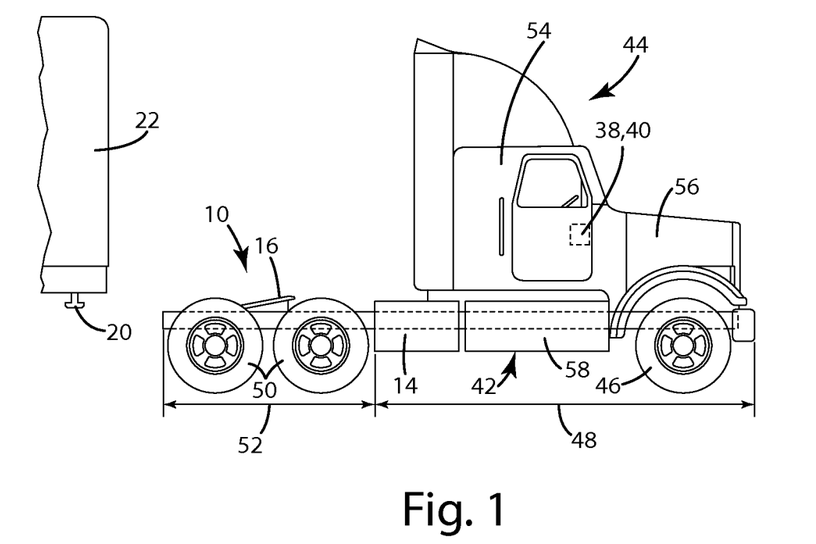
FIG. 1 is a side elevational view of a vehicle having a fifth wheel hitch assembly of the present invention.

For purposes of the description herein, the terms "upper," "lower," "right," "left," "rear," "front," "vertical," "horizontal," and derivatives thereof shall be related to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended drawings. Hence, specific dimensions and other physical characteristics relating to the embodiments disclosed therein are not to be considered to be limiting, unless the claims expressly state otherwise.

Referring now to FIGS. 1-4, the reference numeral 10 generally designates a fifth wheel hitch assembly that includes a support bracket 12 adapted to operably couple with a tractor or vehicle frame 14. The hitch assembly 10 also includes a hitch plate 16 that is coupled to the support bracket 12 for pivoting between a first position and a second position. The hitch plate 16 has a throat 18 adapted to receive a kingpin 20 of a trailer 22. The hitch plate 16 also has an intermediate portion 24 pivotably coupled with the support bracket 12 and has a rearwardly extending rear portion 26 having a first section 28 and a second section 30 juxtapositioned across the throat 18 from one another. The hitch assembly 10 also includes a stabilizer assembly 32 that is operable between an unlocked position 34 and a locked position 36. In the unlocked position 34 the stabilizer assembly 32 is coupled with a select one of the support bracket 12 or the rear portion 26 of the hitch plate 16, such that the hitch plate 16 may pivot between the first and second positions. In the locked position 36 the stabilizer assembly 32 is coupled with the support bracket 12 and the rear portion 26 of the hitch plate 16, thereby restricting movement of the hitch plate 16 between the first and second positions and supporting the first and second sections 26, 28 of the rear portion 26 of the hitch plate 16. In the illustrated example, a controller 38 operates the stabilizer assembly 32 between the unlocked and locked positions 34, 36 from a location 40 remote from the stabilizer assembly 32.

Referring now to FIG. 1, the vehicle frame 14 extends along a bottom portion 42 of a tractor or vehicle 44. The vehicle frame 14 is supported by two front wheels 46 at a front end 48 of the vehicle 44 and by eight rear wheels 50 at a rear end 52 of the vehicle 44. The front end 48 of the vehicle 44 has a cab 54, an engine 56, and fuel tanks 58 that are supported by the vehicle frame 14. At the rear end 52 of the vehicle 44, the vehicle frame or frame member 14 supports the fifth wheel hitch assembly 10 generally between the rear wheels 50. It is contemplated, however, that fewer wheels may be included at the rear end 52 of the vehicle 44.

Figure 2:
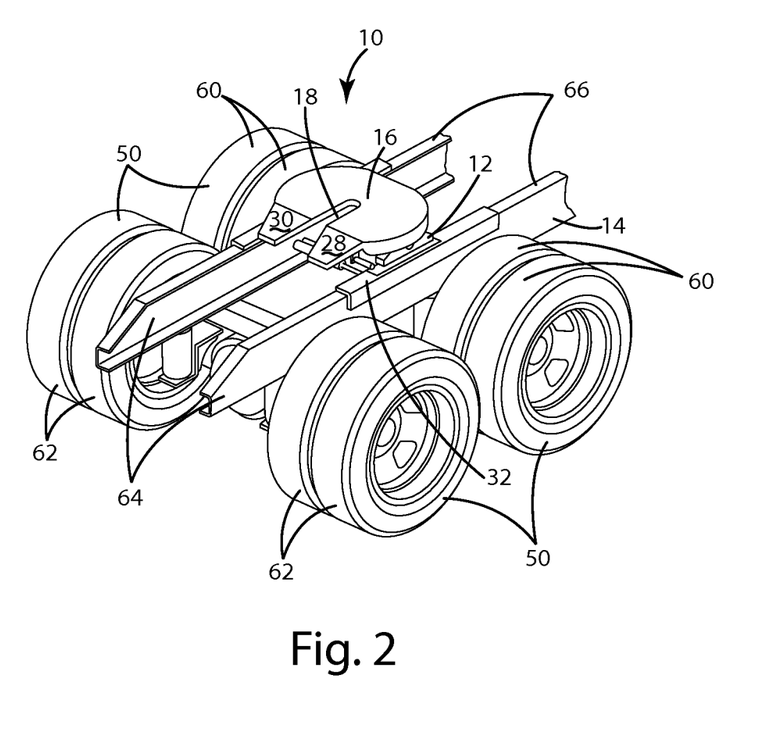
FIG. 2 is a top perspective view of a fifth wheel hitch assembly of the present invention on a vehicle frame.

As illustrated in FIG. 2, the fifth wheel hitch assembly 10 is coupled with the vehicle frame 14 generally between a forward set 60 and a rearward set 62 of the rear wheels 50. The vehicle frame 14 includes two parallel beams 64 extending from the rear end 52 (FIG. 1) to the front end 48 of the vehicle 44 (FIG. 1). The beams 64 are positioned inside the rear wheels 50, such that two wheels are laterally located outside the beams 64 on both sides of the vehicle frame 14 for the forward and rearward sets 60, 62 of the rear wheel 50. The fifth wheel hitch assembly 10 is coupled with a top surface 66 of the beams 64 of the vehicle frame 14 and generally centered laterally between the beams 64. More specifically, the support bracket 12 of the fifth wheel hitch assembly 10 is coupled with the top surface 66 of the beams 64 of the vehicle frame 14. The hitch plate 16 is pivotably coupled with the support bracket 12, aligning the first and the second section 28, 30 to face rearward, substantially positioning the throat 18 of the hitch plate 16 in the center of and in parallel alignment with the beams 64 of the vehicle frame 14. It is contemplated that the fifth wheel hitch assembly 10 may be disposed at other locations along the rear end 52 of the vehicle frame 14.

Figure 3:
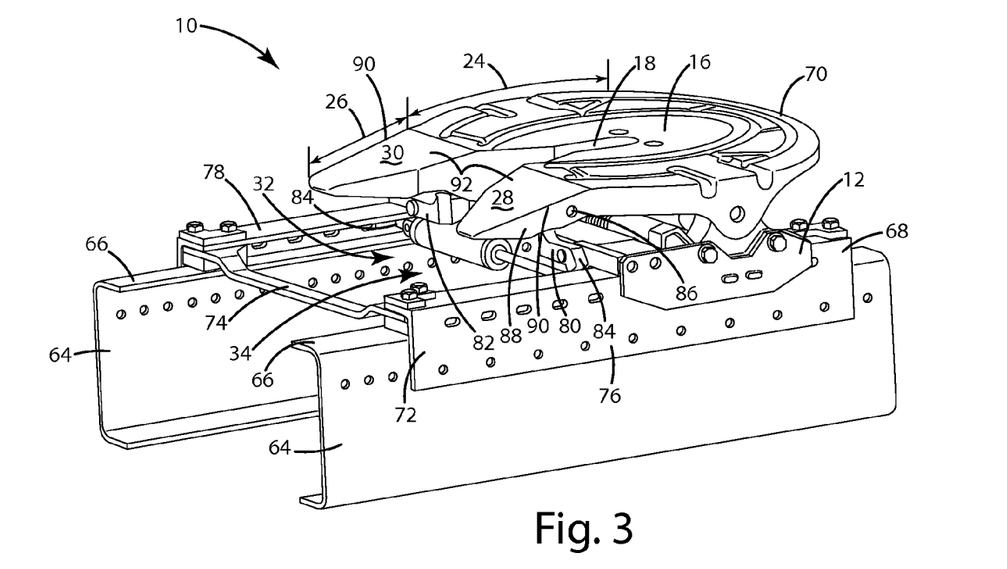
FIG. 3 is a top perspective view a fifth wheel hitch assembly of the present invention with one embodiment of a stabilizer assembly in an unlocked position.

Referring now to FIG. 3, the support bracket 12 is operably coupled with the top surface 66 of the beams 64. The support bracket 12 extends on the beams 64 from a front end 68 that is substantially aligned with a forward end 70 of the hitch plate 16 to a rear end 72 that extends beyond the rear portion 26 of the hitch plate 16. The rear end 72 of the support bracket 12 includes a support beam 74 that extends laterally between a first side 76 and a second side 78 of the support bracket 12, corresponding to the beams 64. Likewise, the stabilizer assembly 32 couples with and extends between the first and second sides 76, 78 of the support bracket 12.

Figure 4:
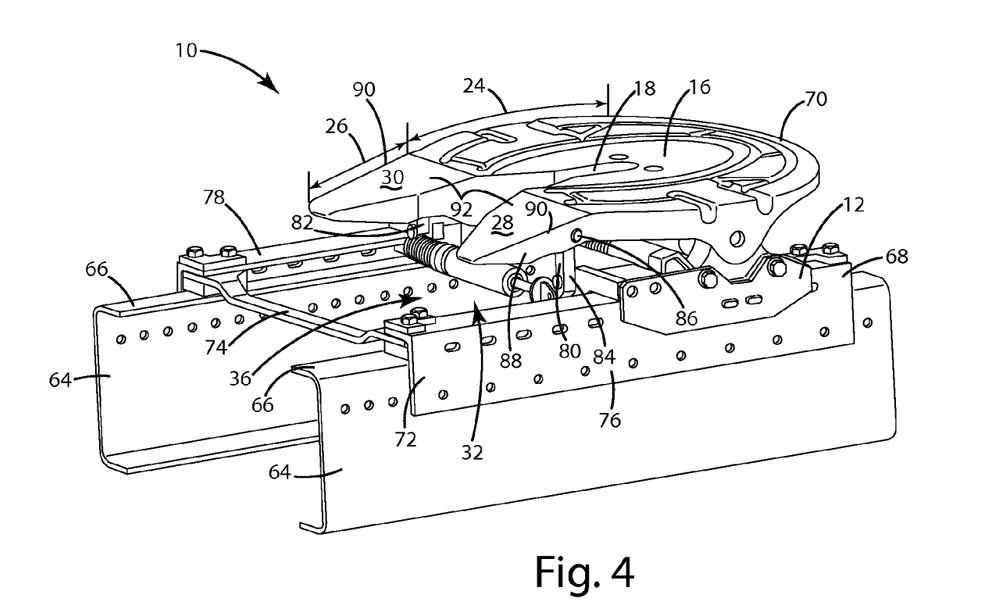
FIG. 4 is a top perspective view a fifth wheel hitch assembly of the present invention with one embodiment of a stabilizer assembly in a locked position.

One embodiment of the stabilizer assembly 32, as illustrated in FIGS. 3-4, includes a first hammer-shaped swing lock 80 and a second hammer-shaped swing lock 82 that are pivotably coupled with the first and second sides 76, 78 of the support bracket 12, respectively, below the first and second sections 28, 30 of the hitch plate 16. A handle end 84 of the first and second swing lock 80, 82 is pivotably coupled with the support bracket 12 in substantially vertical alignment with and below an aperture 86 formed in an outer side flange 88 of the respective first and second section 28, 30. The outer side flange 88 extends down substantially orthogonally from an outside edge 90 of an upper surface 92 of the first and second section 28, 30. In FIG. 3, the apertures 86 are not engaged by the stabilizer assembly 32, and accordingly, the stabilizer assembly is in the unlocked position 34, wherein the hitch plate 16 may pivot about the support bracket 12 between the first and second positions. However, as shown in FIG. 4, the first and second swing lock 80, 82 are engaged with the apertures 86, placing the stabilizer assembly 32 in the locked position 36, such that the hitch plate 16 is restricted from pivoting about the support bracket 12 and the rear portion 26 of the hitch plate 16 is vertically supported at both the first and second section 28, 30.

Figure 5:
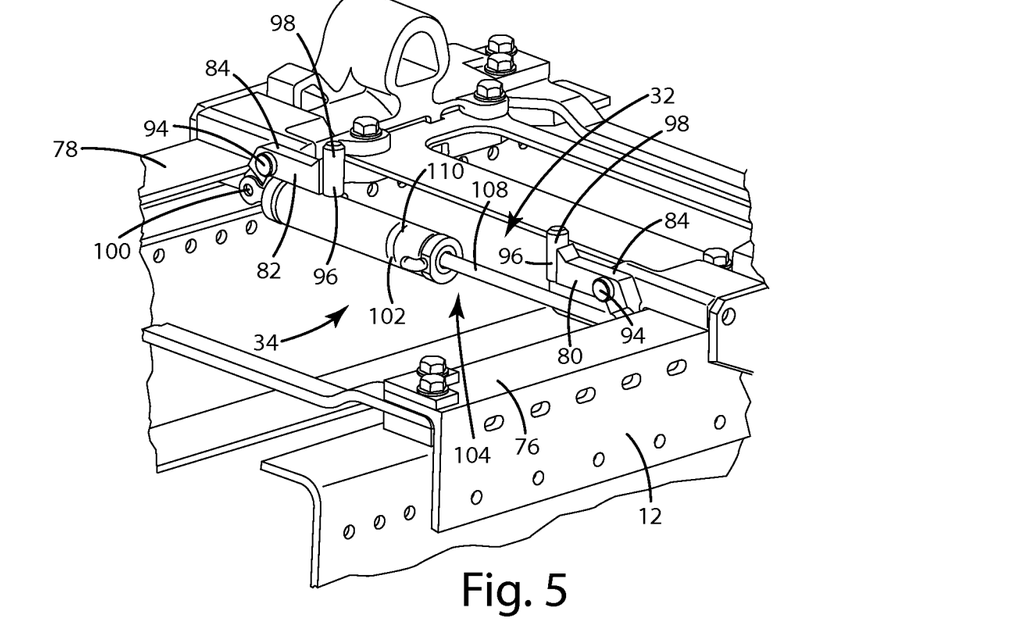
FIG. 5 is an enlarged partial top perspective view of one embodiment of a stabilizer assembly in an unlocked position.

In the unlocked position 34, as shown in FIG. 5 without the hitch plate 16 for illustration purposes, the first and second swing locks 80, 82 extend laterally inward from the first and second sides 76, 78 of the support bracket 12, respectively, whereby the handle ends 84 of the swing locks are pivotably coupled to the sides about a pivot connection 94. The first and second swing locks 80, 82 extend inwardly to a head end 96 that includes a cylindrically shaped post 98 extending orthogonally therefrom. Further, in the unlocked position 34, the first and second swing locks 80, 82 extend at an angle down and outward from the pivot connection 94 to an actuator end 100. A pneumatic cylinder 102 extends between the actuator ends 100 of the handle ends 84 of each of the first and second swing locks 80, 82. The pneumatic cylinder 102 is operable between an expanded condition 104 (FIG. 5) and a contracted condition 106 (FIG. 6) that operates the stabilizer assembly 32 between the unlocked position 34 and the locked position 36, respectively. In the locked position 36, the cylindrically shaped posts 98 engage the apertures 86, detachably coupling head ends 96 of the first and second swing locks 80, 82 with the first and second sections 28, 30 of the hitch plate 16.

Figure 6:
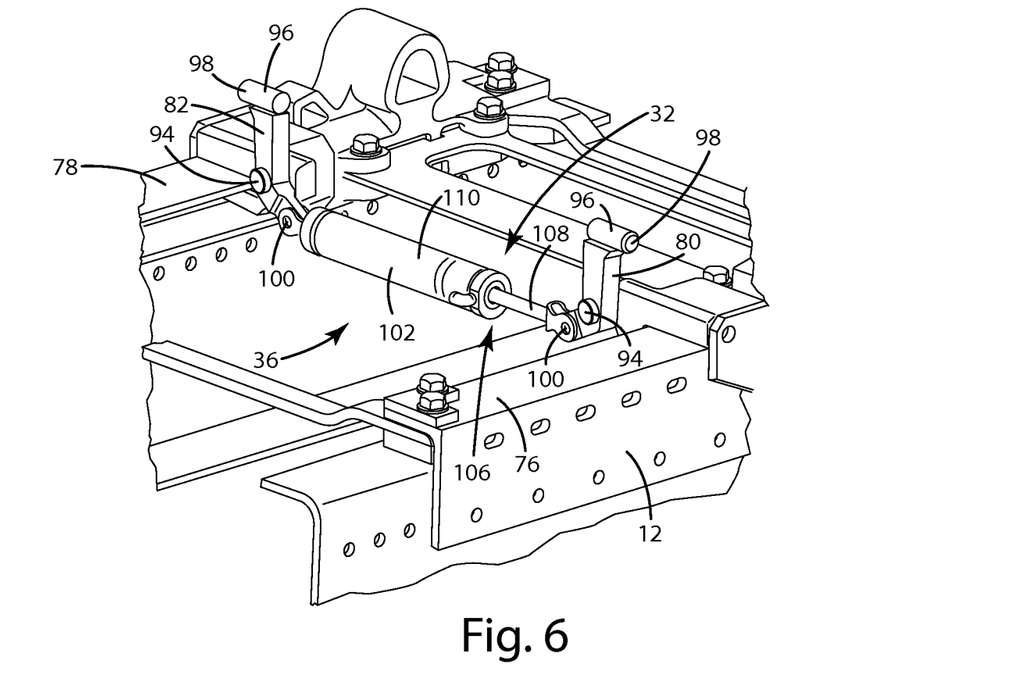
FIG. 6 is an enlarged partial top perspective view of one embodiment of a stabilizer assembly in a locked position.

As illustrated in FIGS. 5 and 6, the pneumatic cylinder 102 includes an extension rod 108 and a cylinder housing 110, wherein the extension rod 108 slidably moves within the cylinder housing 110 upon operation of the pneumatic cylinder 102 between the expanded and contracted positions 104, 106. The pneumatic cylinder 102 is pivotably coupled between the actuator ends 100, at an angled location below the pivot connections 94 of the swing locks 80, 82 with the support bracket 12. As such, the swing locks 80, 82 are permitted to swing from the generally horizontal position, when the pneumatic cylinder 102 is in the extended condition 104, to a substantially vertical position, when the pneumatic cylinder 102 is in the contracted condition 106, allowing the stabilizer assembly 32 to engage in the locked position 36. The pneumatic cylinder 102 is operated by the controller 38 that is placed at the location 40 (FIG. 1), remote from the stabilizer assembly 32, located in the cab 54 (FIG. 1) of the vehicle 44 to operate the stabilizer assembly 32 between the unlocked position 34 and the lock position 36 without a user having to exit the cab 54 of the vehicle 44. However, it is contemplated that the controller 38 may be placed at an alternative location, such as on or near the fifth wheel hitch assembly 10. The pneumatic cylinder 102 is of a type generally known and understood by those skilled in the art, such that the connection and internal operation of the pneumatic cylinder is not described herein.

Figure 7:
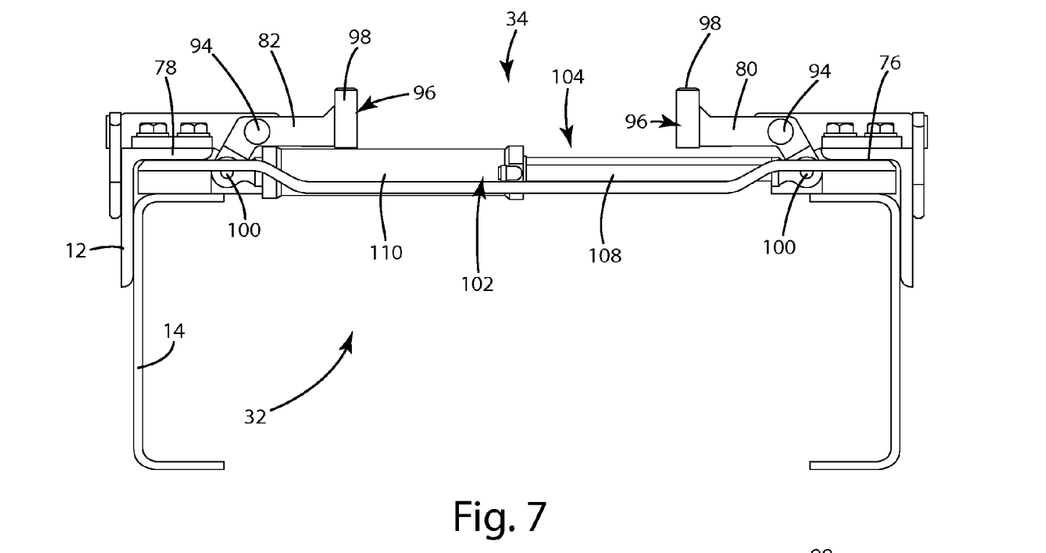
FIG. 7 is a partial rear elevational view of one embodiment of a stabilizer assembly in an unlocked position.
Figure 8:
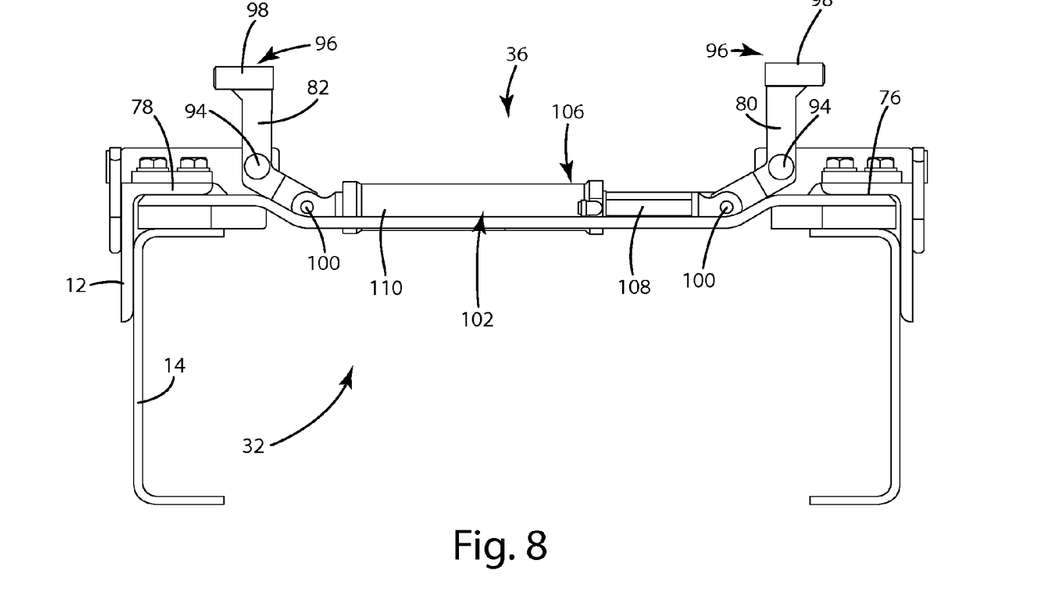
FIG. 8 is a partial rear elevational view of one embodiment of a stabilizer assembly in a locked position.

As further illustrated in FIGS. 7 and 8, in the unlocked position 34, as shown in FIG. 7, the first and second swing locks 80, 82 are substantially horizontal and in linear alignment with each other and the pneumatic cylinder 102 extending there between. In such unlocked position 34, the cylindrical posts 98 extend vertically and substantially orthogonal to the pneumatic cylinder 102. Further, the extension rod 108 of the pneumatic cylinder 102 is extending from the cylinder housing 110 of the pneumatic cylinder 102 to position the actuator end 100 of the first and second swing locks 80, 82 laterally outward from the pivot connection 94 of the swing locks with the support bracket 12.

As shown in FIG. 8, the extension rod 108 of the pneumatic cylinder 102 has extended into the cylinder housing 110, as the pneumatic cylinder 102 is in the contracted condition 106. In the contracted condition 106, the actuator ends 100 of the first and second swing locks 80, 82, have pivoted about the pivot connections 94 laterally inward from the first and second sides 76, 78 of the support bracket 12. In the contracted condition 106 of the pneumatic cylinder 102, the swing locks 80, 82 are substantially vertical, such that the cylindrical posts 98 on the head ends 96 are substantially horizontal and in coaxial alignment with the apertures 86 formed in the first and second section 28, 30 of the hitch plate 16 (FIG. 4). Accordingly, the first and second swing locks 80, 82 pivot ninety degrees between the expanded and contracted conditions 104, 106 of the pneumatic cylinder 102. The engagement of the cylindrical posts 98 on the first and second swing locks 80, 82 with the apertures 86 place the stabilizer assembly 32 in the locked position 36. It is also contemplated that the first and second swing locks 80, 82 are pivotably coupled in an alternative arrangement with the support bracket 12 or the vehicle frame 14 such that the first and second swing locks 80, 82 couple with the first and second section 28, 30, respectively, of the hitch plate 16 (FIG. 4).

Figure 9:
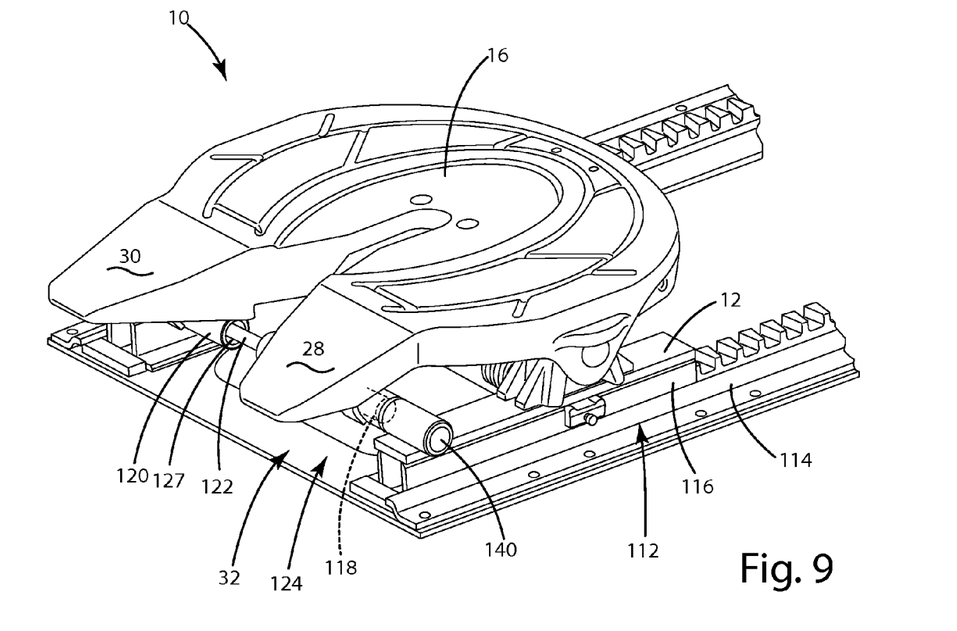
FIG. 9 is a top perspective view of a fifth wheel hitch assembly of the present invention with another embodiment of a stabilizer assembly in an unlocked position.
Figure 10:
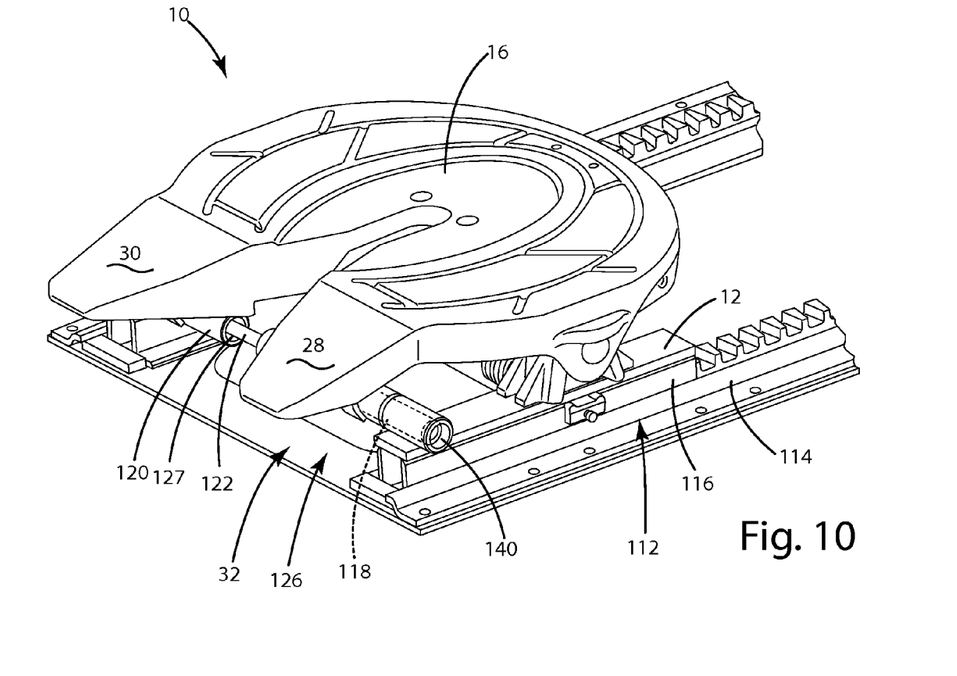
FIG. 10 is a top perspective view of a fifth wheel hitch assembly of the present invention with another embodiment of a stabilizer assembly in a locked position.

Referring now to FIGS. 9 and 10, a track assembly 112 is adapted to be coupled between the support bracket 12 of the fifth wheel hitch assembly 10 and the vehicle frame 14 (not shown), allowing the hitch plate 16 to be slidably positioned at various horizontal fore-aft positions relative to the rear end 52 the vehicle frame 14 (FIG. 1). The track assembly 112 includes a rail 114 that is coupled with the vehicle frame 14 and slidably engaged with a carriage 116 supporting the support bracket 12. It is contemplated that the support bracket 12 may be operably coupled with the beams 64 of the vehicle frame 14 (FIG. 2), without the track assembly, as illustrated in FIGS. 3-8. However, it is also contemplated that the stabilizer assembly 32 embodiment illustrated in FIGS. 3-8, may be adapted to include a track assembly.

As further illustrated in FIGS. 9 and 10, an alternative embodiment of the stabilizer assembly 32 is shown, including a first pin 118 and second pin 120 slidably coupled below the first and second section 28, 30 of the hitch plate 16, respectively. A threaded rod 122 is threadably engaged with and extends between the first and second pins 118, 120, such that axle rotation of the threaded rod 122 translates the pins 118, 120 between the unlocked position 124 (FIG. 9) and the locked position 126 (FIG. 10). The threaded rod 122 is coaxially disposed within a cylindrical cavity 127 in the first and second pins and threadably engaged therein.

Figure 11:
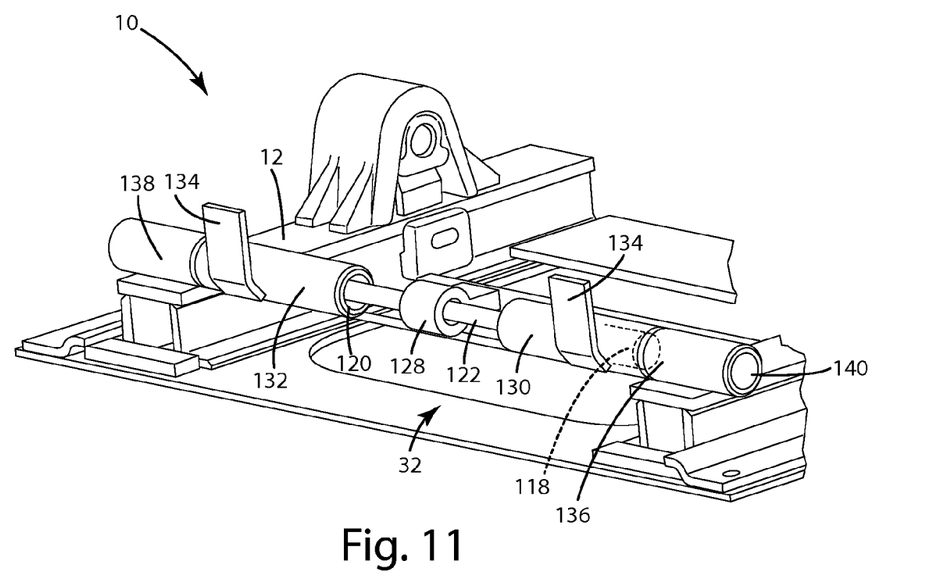
FIG. 11 is an enlarged partial top perspective view of a fifth wheel hitch assembly with another embodiment of a stabilizer assembly in an unlocked position.
Figure 12:
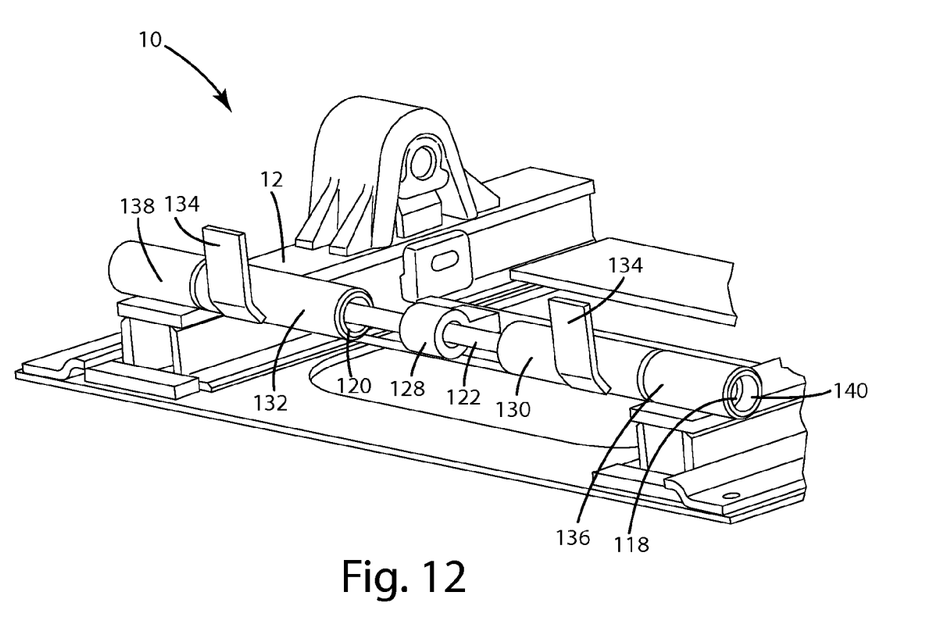
FIG. 12 is an enlarged partial top perspective view of a fifth wheel hitch assembly with another embodiment of a stabilizer assembly in a locked position.

As shown in FIGS. 11 and 12, the fifth wheel hitch assembly 10 is shown without the hitch plate 16 for illustration purposes. A rotation motor 128 is centrally positioned between the first and second pins 118, 120 and thereby substantially aligned below the throat of the hitch plate (FIG. 10). The rotation motor 128 is geared to engage the threaded rod 122 about a geared portion (not shown) thereof, such that axial rotation of the threaded rod 122 by the rotation motor 128 causes, otherwise stationary, axial rotation of the threaded rod 122. Such rotation, in turn, causes lateral translation of the first and second pins 118, 120 within a respective first tubular housing 130 and second tubular housing 132. The first and second tubular housings 130, 132 have a connection bracket 134 extending vertically therefrom allowing the connection bracket 134 to attach with a bottom portion of the respective first and second section 28, 30 of the hitch plate 16 (FIG. 10). Upon pivotable alignment of the hitch plate 16, about the support bracket 12, the first and second tubular housings 130, 132 laterally and coaxially align with a respective first engagement port 136 and second engagement port 138 disposed on the support bracket 12. The first and second engagement ports 136, 138 have a cylindrical hole 140 formed therein that coaxially aligns and is adapted to receive the respective first and second pins 118, 120. As shown in FIG. 12, the first pin 118 is engaged with the hole 140 in the first engagement port 136, first with a portion of the first pin 118 remaining within the first tubular housing 130 transitioning the stabilizer assembly 32 to the locked position 126, wherein shear stress is applied to the first pin 118 when the hitch plate 16 is restricted from pivoting about the support bracket 12. In the locked position 126, the hitch plate 16 (not shown) is restricted from pivoting about the support bracket 12 by both the first and second pins 118, 120, stabilizing the rear portion 26 of the hitch plate 16 at the first and second section 28, 30.

Figure 13:
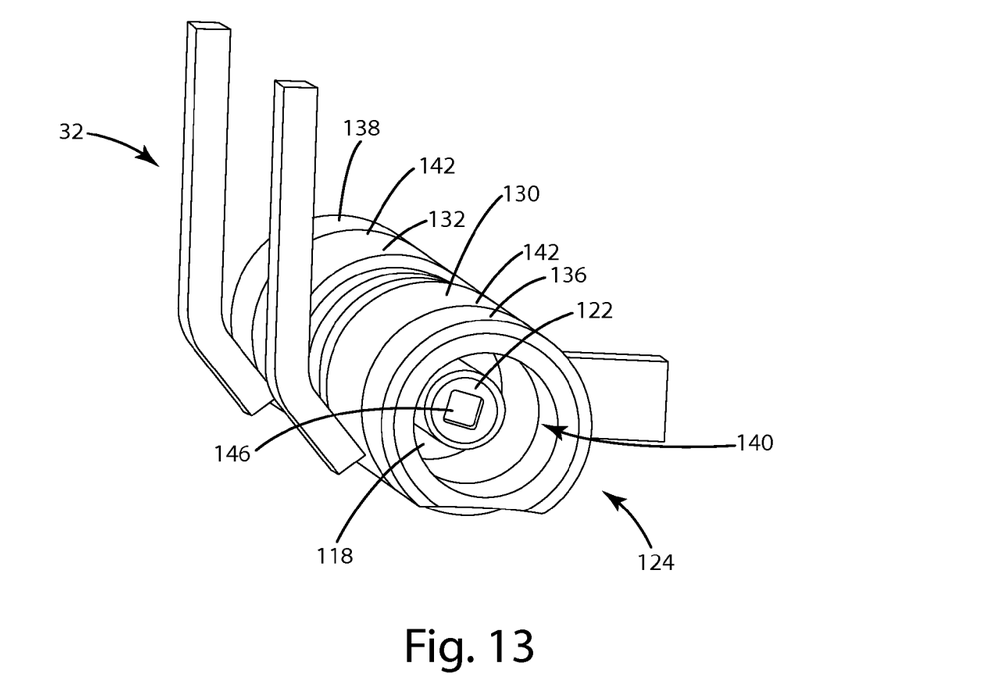
FIG. 13 is an enlarged side elevational view of the stabilizer assembly of FIG. 11.
Figure 14:
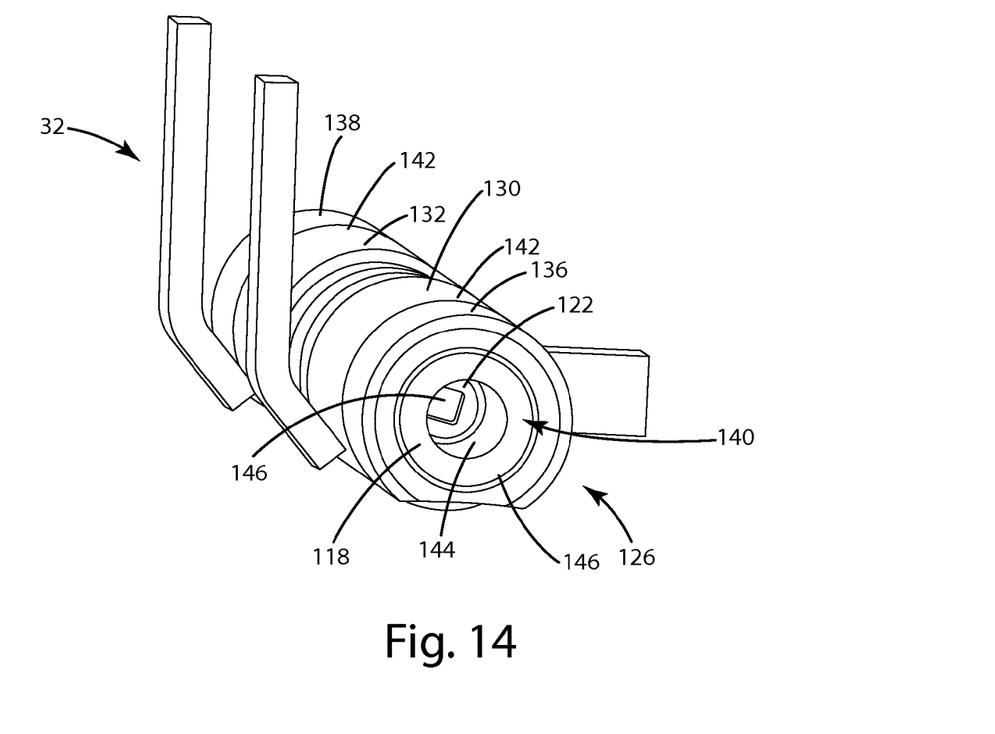
FIG. 14 is an enlarged side elevational view of the stabilizer assembly of FIG. 12.

As shown in FIGS. 13 and 14, the threaded rod 122 extends within the tubular housing 130, 132 to an outside edge 142 thereof, and accordingly, the threaded rod 122 and the first and second pins 118, 120 (not shown) threadably engaged therewith pivot with the hitch plate 16 (not shown) when the stabilizer assembly 32 is in the unlocked position 124. The first and second pins 118, 120 are substantially tubular shaped and include a threaded inside surface 144 to engage the threaded rod 122 and a substantially smooth exterior surface 146 to slidably engage the respective engagement port 136, 138 in the locked position 126. The threaded rod 122 includes a square shaped indentation 146 on the end surface thereof. The indentation 146 is formed to receive a tool that may be inserted through the cylindrical hole 140 in the engagement port 136, 138 and engage the threaded rod 122 to axially rotate the threaded rod 122 and thereby adjust the lateral position of the first and second pin 118, 120 with respect to the first and second engagement ports 136, 138. It is contemplated that the rotation motor 128 may not be included or may incur periods of non-functionality, wherein the utilization of the indentation and a tool to axially rotate the threaded rod 122 may be necessary. It is further contemplated that the first and second pin 118, 120 may have an alternative locked position 126 from that illustrated in FIGS. 10, 12, and 14.

As generally illustrated in FIGS. 1-14 the method for stabilizing the hitch plate 16 of the fifth wheel hitch assembly 10 includes providing the vehicle frame member 14; the support bracket 12 operably coupled with the frame member 14; and the hitch plate 16 pivotably coupled to the support bracket 12 for pivotable movement between the first position and the second position, and having the rearwardly extending first section 28 and the rearwardly extending second section 30. The stabilizer assembly 32 is operable between an unlocked position 34, wherein the hitch plate 16 may pivot between the first and second positions, and a locked position 36, wherein the first and second sections 28, 30 are detachably coupled with the support bracket 12, thereby restricting movement of the hitch plate 16 between the first and second positions. The hitch plate 16 is pivoted about the support bracket 12 to position the first and second sections 28, 30 in alignment with the support bracket 12 to allow for the stabilizer assembly 32 to transition from the unlocked position 34 to the locked position 36. The first and second sections 28, 30 of the hitch plate 16 are coupled with the support bracket 12 to restrict the pivotable movement of the hitch plate 16 between the first and second positions and stabilize the first and section sections 28, 30 of the hitch plate 16, thereby engaging the stabilizer assembly 32 in the locked position 36.

In the forgoing description it will be readily appreciated by those skilled in the art that modifications may be made to the invention without departing from the concepts as disclosed herein. Such modifications are to be considered as included in the following claims, unless these claims by their express language state otherwise.

The invention claimed is:

1. A fifth wheel hitch assembly, comprising:
a support bracket adapted to operably couple with a tractor frame;
a hitch plate pivotably coupled to the support bracket for pivoting between a first position and a second position, the hitch plate including a throat adapted to receive a kingpin of a trailer and a rearwardly extending rear portion having a first section and a second section juxtapositioned across the throat from one another;
a stabilizer assembly including a first swing lock member and a second swing lock member, each pivotably coupled at a first end thereof with the support bracket below the first and second sections, respectively, wherein the first and second swing lock members are pivotal between an unlocked position having the first and second swing lock members detached from the hitch plate and a locked position having a second end of each of the first and second swing lock members removably coupled with the respective first and second sections of the hitch plate, thereby restricting movement of the hitch plate between the first and second positions and supporting the first and second sections of the rear portion of the hitch plate; and
a controller that operates the stabilizer assembly between the unlocked and locked positions from a location remote from the stabilizer assembly.

2. The fifth wheel hitch assembly of claim 1, further comprising:
a track assembly adapted to be coupled between the support bracket and the tractor frame, wherein the track assembly is adapted to adjustably position the hitch plate horizontally with respect to the tractor frame.

3. The fifth wheel hitch assembly of claim 1, wherein the first and second swing lock members of the stabilizer assembly each include a hammer shape with the first end being a handle end thereof and the second end being a head end thereof.

4. The fifth wheel hitch assembly of claim 3, wherein the head ends of the first and second swing lock members each include a cylindrically shaped post extending orthogonally therefrom that engages an aperture formed in an outer side flange of the respective first and second section of the hitch plate when the stabilizer assembly is in the locked position.

5. The fifth wheel hitch assembly of claim 3, wherein the stabilizer assembly includes a pneumatic cylinder extending between the handle end of each of the first and second swing locks, and wherein the pneumatic cylinder is operable between an expanded condition and a contracted condition that operates the stabilizer assembly between the unlocked and the locked positions.

6. A fifth wheel hitch assembly, comprising:
a vehicle frame member;
a support bracket operably coupled to the vehicle frame member;
a hitch plate including a throat adapted to receive a kingpin of a trailer and a rear portion that has a first section and a second section juxtapositioned across the throat from one another, wherein the hitch plate is pivotably coupled to the support bracket for pivoting between a first position and a second position;
a stabilizer assembly including a first lock member proximate the first section of the rear portion of the hitch plate and a second lock member proximate the second section of the rear portion of the hitch plate, wherein the stabilizer assembly is operable between an unlocked position for the hitch plate to pivot between the first and second positions and a locked position having an end of each of the first and second lock members detachably coupled with an aperture in at least one of the hitch plate and the support bracket to engage the first and second lock members between the respective first and second sections of the rear portion of the hitch plate and the support bracket, thereby restricting pivotable movement of the hitch plate between the first and second positions, wherein the first and second lock members each include a hammer shape pivotal at a handle end and detachable at an opposite head end, wherein the head ends of the first and second lock member each include a cylindrically shaped post extending orthogonally therefrom that engages the aperture formed in an outer side flange of the respective first and second sections of the hitch plate when the stabilizer assembly is in the locked position; and
a controller that operates the stabilizer assembly between the unlocked and locked positions from a location located remotely from the stabilizer assembly.

7. The fifth wheel hitch assembly of claim 6, further comprising:
   a track assembly coupled between the support bracket and the vehicle frame, wherein the track assembly slidably adjusts the hitch plate along the track assembly with respect to the vehicle frame.

8. The fifth wheel hitch assembly of claim 6, wherein the stabilizer assembly includes a pneumatic cylinder extending between the handle ends of each of the first and second swing locks, and wherein the pneumatic cylinder is operable between an expanded condition and a contracted condition that operates the stabilizer assembly between the unlocked and the locked positions.

9. A method for stabilizing a hitch plate of a fifth wheel hitch assembly, comprising:
   providing a vehicle frame member;
   providing a support bracket operably coupled with the frame member;
   providing a hitch plate pivotably coupled to the support bracket for pivoting between a first position and a second position and having a rearwardly extending first section and a rearwardly extending second section;
   providing a stabilizer assembly having a first hammer-shaped swing lock and a second hammer-shaped swing lock pivotably coupled with the support bracket below the first and second sections and operable between an unlocked position for the hitch plate to pivot between the first and second positions and a locked position having the first and second hammer-shaped swing locks detachably coupled, respectively, with the first and second sections, thereby restricting pivotable movement of the hitch plate between the first and second positions;
   operating the stabilizer assembly between the unlocked and locked positions via a controller positioned at a location remote from the stabilizer assembly;
   pivoting the hitch plate about the support bracket to position the first and second sections in alignment with the support bracket to allow for the stabilizer assembly to transition from the unlocked position to the locked position; and
   coupling the rearwardly extending first and second sections of the hitch plate with the support to bracket to restrict the pivotable movement of the hitch plate between the first and second positions and stabilize the first and second sections of the hitch plate, thereby engaging the stabilizer assembly in the locked position.

10. The method for stabilizing a fifth wheel hitch assembly of claim 9, wherein a pneumatic cylinder extends between a handle end of each of the first and second hammer-shaped swing locks and is operable between an expanded position and a contracted position, and wherein a head end of each of the first and second hammer-shaped swing locks engages the respective first and second sections of the hitch plate when the pneumatic cylinder is in the contracted position.

\* \* \* \* \*